March 16, 1954     R. R. FARRELL     2,672,136
TOP CYLINDER OILER
Filed Nov. 7, 1950
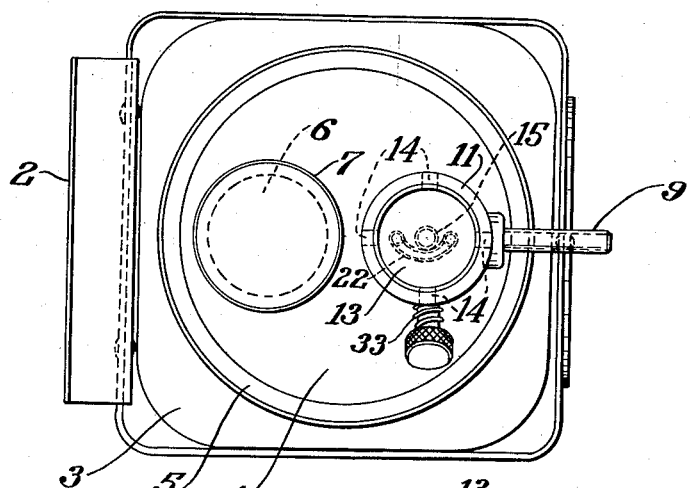
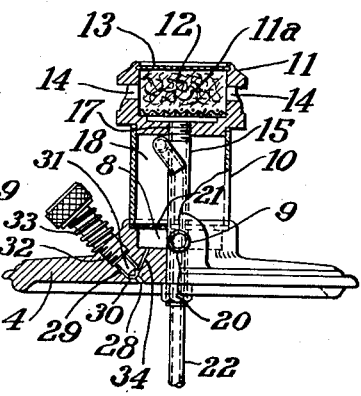
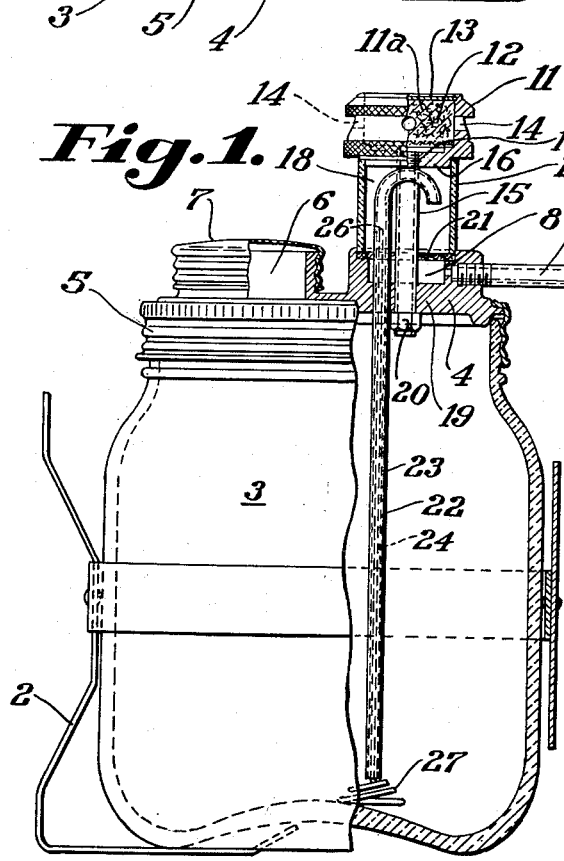
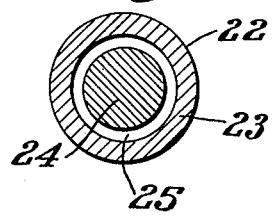
INVENTOR
Richard R. Farrell Patented Mar. 16, 1954

2,672,136

UNITED STATES PATENT OFFICE 2,672,136

TOP CYLINDER OILER

Richard R. Farrell, Oakmont, Pa., assignor to Universal Lubricating Systems, Inc., Oakmont, Pa., a corporation of Delaware Application November 7, 1950, Serial No. 194,513

5 Claims. (Cl. 123—196)

This invention relates to top cylinder oilers, i. e., oilers for delivering oil to the upper portions of the cylinders of internal combustion engines for the purpose of maintaining valves in good condition, preventing formation of carbon and applying lubricant to the upper portions of the cylinder walls.

Various types of top cylinder oilers have heretofore been proposed but none has been fully satisfactory. In general such oilers have been unreliable in operation and also of complex construction and hence costly. One of the primary difficulties has been the inability to obtain a substantially uniform flow of oil under uniform suction from the engine during gradual decrease in the depth of oil in the oil reservoir of the oiler. The oil is withdrawn by the engine suction from a body of oil in the oil reservoir. This is accomplished by positioning an oil delivery conduit in the oil in the oil reservoir with the receiving end of the conduit near the bottom of the reservoir and suitably connecting the conduit to the intake manifold. The depth or head of oil in the oil reservoir has had an appreciable effect on the rate of feed of oil through the oil delivery conduit for any particular engine speed so for uniform suction from the engine the rate of feed of the oil has varied from relatively fast when the oil is relatively deep in the oil reservoir to relatively slow when the oil is relatively shallow in the oil reservoir.

Various attempts have been made to solve the problem and bring about a uniform flow of oil through the oil delivery conduit under uniform suction from the engine despite material change in the depth of oil in the oil reservoir. One such attempt has involved the provision of a bell in the oil reservoir at the lower end of the oil delivery conduit, the bell being intended to maintain that portion of the oil in the reservoir which is in direct communication with the lower end of the oil delivery conduit under a substantially constant head of oil regardless of the head or depth of oil in the oil reservoir. The oiler having the bell was relatively complex and expensive yet did not solve the problem. If there was even slight leakage of air into the oil reservoir uniform flow of oil through the oil delivery conduit under uniform suction from the engine was not accomplished but varied not only with the depth of oil in the oil reservoir but also with the amount of air leaking in. Other attempts have similarly failed to solve the problem.

I have discovered how to solve the problem above referred to and to insure substantially uniform flow of oil through the oil delivery conduit under uniform suction from the engine despite material change in the depth of oil in the oil reservoir. I have found that by rendering the depth of oil in the oil reservoir a factor of very minor bearing on the rate of flow of oil through the oil delivery conduit I can obtain a rate of flow which under uniform suction of the engine is sufficiently nearly uniform despite material change in the depth of oil in the oil reservoir to satisfactorily accomplish the result sought.

I make the effective cross-sectional area of the oil delivery conduit so small as to impose restriction to the flow of oil therethrough sufficient to insure substantially uniform flow of oil through the oil delivery conduit under uniform suction from the engine despite material change in the depth of oil in the oil reservoir. I preferably dispose a rod in the oil delivery conduit reducing the effective cross-sectional area of the oil delivery conduit so as to impose restriction to the flow of oil therethrough sufficient to insure substantially uniform flow of oil through the oil delivery conduit under uniform suction from the engine despite material change in the depth of oil in the oil reservoir. The rod may be in the form of a wire, round or otherwise. The rod preferably largely fills the oil delivery conduit transversely and extends upwardly into the oil delivery conduit from the bottom thereof to a point near the top thereof. The rod preferably has a foot resting upon the inner surface of the bottom of the oil reservoir. The foot is preferably transversely turned and is desirably a generally helical foot having its bottom resting upon the inner surface of the bottom of the oil reservoir.

Preferably a chamber is provided which is generally above the oil reservoir and the oil delivery conduit has its upper end in the chamber and its lower end in the oil reservoir near the bottom thereof and a connection is provided from the chamber adapted to extend to the top of a cylinder of an internal combustion engine. The oil delivery conduit preferably constitutes the sole connection between the interior of the chamber and the interior of the oil reservoir.

I preferably provide an air inlet tube extending between the inside of the oil reservoir at the top thereof and the outside atmosphere passing through but not communicating with the chamber. A strainer may be mounted atop the chamber for straining air drawn in through the air inlet tube.

The effective cross-sectional area of the oil delivery conduit may in view of the above teaching be determined by any person skilled in the art to accomplish the desired results under particular conditions. Because of the variable factors involved no empirical formula can be given. By way of example, I have found that using SAE No. 20 oil at 80° F. with an oil delivery conduit having an internal diameter of .055″ with a circular wire disposed in the oil delivery conduit the effective area of the oil delivery conduit, i. e., the area of the annular passage within the tube and outside the wire, should be not less than about .00025 square inches and not more than about .00055 square inches. At lower temperature or with more viscous oil a greater effective cross-sectional area of the oil delivery conduit should be provided.

It is not necessary to employ a tube with a rod in it for the oil delivery conduit. A small bore tube without a rod in it may be used. However, I prefer to employ a somewhat larger tube with a rod in it because tubes of sufficiently small bore to accomplish the result without rods therein are not obtainable in metal but only in glass and a glass tube for such use is undesirable because of danger of breakage. If a glass tube should be employed the upper and lower limits of the effective cross-sectional area would ordinarily be somewhat lower than the limits given above for an annular oil delivery passage, all other factors being the same, because a tube without a rod in it offers less resistance to the flow of oil therethrough per unit of area of the inner wall of the tube than a tube with a rod in it in which resistance to the flow of oil is offered not only by the inner wall of the tube but also by the wall of the rod. Once a person skilled in the art understands that the effective cross-sectional area of the oil delivery conduit should be so small as to impose restriction to the flow of oil therethrough of such magnitude that the depth of the oil in the oil reservoir becomes a negligible factor in the rate of delivery of oil under constant suction it is a simple matter to determine the effective cross-sectional area for the oil delivery conduit for any particular set of circumstances, i. e., for oil of particular viscosity used at a particular temperature. While the flow of oil through the oil delivery conduit may not be absolutely uniform it will be close enough to absolute uniformity to serve the purpose intended.

Other details, objects and advantages of the invention will become apparent as the following description of a present preferred embodiment thereof proceeds.

In the accompanying drawings I have shown a present preferred embodiment of the invention in which:

Figure 1 is a view partly in elevation and partly in vertical cross-section through a top cylinder oiler;

Figure 2 is a plan view of the oiler shown in Figure 1;

Figure 3 is a fragmentary view, partly in elevation and partly in vertical cross-section, through a portion of the structure shown in Figure 1 taken at right angles to that figure; and Figure 4 is a greatly enlarged diagrammatic cross-sectional view of the oil delivery conduit with a rod therein.

Referring now more particularly to the drawings, the invention will be described as embodied in a top cylinder oiler for an automobile. There is fastened to the fire wall of an automobile a carrying bracket 2 which carries a glass jar 3 forming an oil reservoir. Seated atop the jar 3 and sealed thereto is a top 4 which is held in place by an annular screw cap 5. The top 4 has an open neck 6 to which is applied a screw cap 7 normally closing the oiler but which may be removed in order to fill it with oil.

The top 4 has an upwardly open well 8 with which communicates a conduit 9 leading to the intake manifold of the automobile. The conduit 9 may communicate with the interior of the intake manifold at the gasket between the intake manifold flange and the carburetor flange or at any other suitable point. The suction existing in the intake manifold creates a negative pressure in the conduit 9 tending to suck out the contents of the well 8.

Sealed in the well 8 is an upwardly extending glass cylinder 10 to which is applied and sealed a cap 11. The cap 11 has an upwardly open bore 11a, straining or filtering material 12 being disposed therein. The bore 11a is closed at the top by a closure plate 13. The cap 11 has holes 14 entering it laterally to admit air to the bore 11a where the straining or filtering material 12 is disposed. The straining or filtering material may be any suitable material, such, for example, as brass wool.

A tube 15 is threaded into the bottom 16 of the cap 11 as shown at 17. The tube 15 passes downwardly through the chamber 18 within the cylinder 10 and through the well 8 and through the body 19 of the top 4 to the interior of the oil reservoir 3 where a nut 20 is applied to it as shown in Figure 1. The tube 15 is an air inlet tube which admits air from the outside atmosphere to the oil reservoir 3 above the oil in the reservoir. Air from the outside atmosphere enters the cap 11 through the holes 14, is strained or filtered by passage through the straining or filtering material 12 and passes downwardly through the air inlet tube 15 to the upper portion of the oil reservoir 13. Thus the incoming air passes through but does not communicate with the chamber 18 and the well 8.

A baffle 21 is disposed at the top of the well 8 and the bottom of the chamber 18. The baffle 21 does not shut off communication between the chamber 18 and the well 8; on the contrary there is free communication between the chamber and the well through the baffle, as about the periphery of the air inlet tube 15 and about the periphery of the oil delivery conduit presently to be described. The air inlet tube and the oil delivery conduit pass through holes in the baffle 21 which are somewhat larger than the outside diameters of the air inlet tube and the oil delivery conduit respectively so that oil in the chamber 18 moves downwardly from that chamber into the well 8 where it may be drawn through the conduit 9 into the intake manifold and thence to the tops of the cylinders of the internal combustion engine. The baffle 21 is to inhibit turbulence.

The oil delivery conduit is designated 22. It consists of a metal tube 23 in which is disposed a rod 24. The rod 24 is shown as being in the form of a circular wire. In the structure shown in the drawings the internal diameter of the metal tube is .055″ and the diameter of the wire 24 is .051″. The area of the annular passage 25 between the inner wall of the tube 23 and the wall of the wire 24 is .000333 square inch. I find this size to be ideal using SAE No. 20 oil at 80° F. although the effective cross section of the annular oil delivery passage may under those conditions be as low as about .00025 square inch or as high as about .00055 square inch while still accomplishing the results sought.

The oil delivery conduit 22 passes through the body 19 of the top 4 and through the well 8 and the baffle 21 and into the chamber 18 where the top of the tube 23 is bent into substantially inverted J-shape as shown in Figure 1. The tube is also bent somewhat laterally to avoid the air inlet tube 15 as shown in Figure 3. The bottom of the tube 23 is near the bottom of the oil reservoir 3. The wire 24 enters the tube 23 from the bottom and extends upwardly therewithin to a point near the top thereof. In Figure 1 the top of the wire 24 is shown at 26. The wire 24 has a foot resting upon the inner surface of the bottom of the oil reservoir 3. The foot is transversely turned and in the structure shown is generally helical, being designated 27 in Figure 1.

An inclined bore 28 extends through the top 4. The bore 28 is enlarged at 29, a tapered seat 30 being formed therein. A needle valve 31 is threaded into the bore at 32, being tensioned by a spring 33. Another bore 34 extends from the tapered seat 30 to the bottom of the well 8. The needle valve 31 may be adjusted to permit any desired quantity of air within the capacities of the bores 28 and 34 to be drawn through those bores from the oil reservoir 3 to the well 8, the bores forming a by-pass. The more air that is drawn through the by-pass the weaker is the suction in the chamber 18 and well 8.

When the top cylinder oiler is to be used it is filled with oil to a point near the top of the oil reservoir 3. The cap 7 is applied to keep out dust and dirt and to keep the oil clean and to prevent it from splashing out during operation of the automobile. When the internal combustion engine is started the vacuum in the conduit 9 is transmitted to the well 8 and the chamber 18 and thence to the annular oil delivery passage 25. By reason of the small effective cross-sectional area of such passage sufficient restriction to the flow of oil therethrough is imposed that the factor of the level of the oil in the oil reservoir 3 becomes negligible and the amount of oil fed through the oil delivery conduit is substantially uniform under uniform suction from the engine despite material change in the depth of oil in the oil reservoir. The oil sucked upwardly through the oil delivery conduit drips drop by drop from the reversely turned upper end thereof which is disposed within the chamber 18 and falls upon the baffle 21 whence it flows downwardly about the air inlet tube 15 and the oil delivery conduit into the well 8 where it is sucked into the conduit 9 and ultimately passes through the intake manifold to the tops of the cylinders of the internal combustion engine.

The glass cylinder 10 is transparent so the drops of oil dripping from the oil delivery conduit within the chamber 18 can be seen through the glass and if desired counted. The needle valve 31 is adjusted so that the desired number of drops per unit of time issue from the oil delivery conduit into the chamber 18. The number of drops of oil per unit of time thus issuing is substantially constant under uniform suction from the engine despite material change in the depth of oil in the oil reservoir.

I find that as long as there is any oil at all in the oil reservoir 3 while the internal combustion engine continues in operation the oil will pass upwardly along the helix 27 and into the oil delivery conduit. This appears to be because of the employment of a transversely turned foot at the lower end of the wire 24. It is desirable that the slope of the foot be gradual until the oil passing therealong enters the lower end of the tube 23. I believe that the passage of the oil along the foot of the wire comes about through surface tension.

As the oil from within the oil reservoir is withdrawn the space previously occupied by the withdrawn oil is filled by filtered air admitted through the air inlet tube 15.

While I have shown and described a present preferred embodiment of the invention it is to be distinctly understood that the invention is not limited thereto but may be otherwise variously embodied within the scope of the following claims.

I claim:

1. A top cylinder oiler comprising an oil reservoir, a chamber generally above the oil reservoir, an oil delivery conduit having its lower end in the oil reservoir near the bottom thereof and its upper end in the chamber, the upper end of the oil delivery conduit being turned so that oil delivered through the oil delivery conduit from the oil reservoir to the chamber drips from the upper end of the oil delivery conduit, a connection from the chamber adapted to extend to the top of a cylinder of an internal combustion engine and a rod in the oil delivery conduit reducing the effective cross-sectional area of the oil delivery conduit so as to impose restriction to the flow of oil therethrough sufficient to insure substantially uniform flow of oil through the oil delivery conduit under uniform suction from the engine despite material change in the depth of oil in the oil reservoir, the bottom of the rod resting on the bottom of the oil reservoir.

2. A top cylinder oiler comprising an oil reservoir, a chamber generally above the oil reservoir, an oil delivery conduit having its lower end in the oil reservoir near the bottom thereof and its upper end in the chamber, the upper end of the oil delivery conduit being turned so that oil delivered through the oil delivery conduit from the oil reservoir to the chamber drips from the upper end of the oil delivery conduit, a connection from the chamber adapted to extend to the top of a cylinder of an internal combustion engine and a rod in the oil delivery conduit reducing the effective cross-sectional area of the oil delivery conduit so as to impose restriction to the flow of oil therethrough sufficient to insure substantially uniform flow of oil through the oil delivery conduit under uniform suction from the engine despite material change in the depth of oil in the oil reservoir, the bottom of the rod resting on the bottom of the oil reservoir and the top of the rod terminating below the turned portion of the oil delivery conduit.

3. A top cylinder oiler comprising an oil reservoir, a chamber generally above the oil reservoir, an oil delivery conduit having its lower end in the oil reservoir near the bottom thereof and its upper end in the chamber, the upper end of the oil delivery conduit being turned so that oil delivered through the oil delivery conduit from the oil reservoir to the chamber drips from the upper end of the oil delivery conduit, a connection from the chamber adapted to extend to the top of a cylinder of an internal combustion engine and a rod in the oil delivery conduit reducing the effective cross-sectional area of the oil delivery conduit so as to impose restriction to the flow of oil therethrough sufficient to insure substantially uniform flow of oil through the oil delivery conduit under uniform suction from the engine despite material change in the depth of oil in the oil reservoir, the rod having a laterally extending terminal portion at its lower end resting on the bottom of the oil reservoir.

4. A top cylinder oiler comprising an oil reservoir, a chamber generally above the oil reservoir, an oil delivery conduit having its lower end in the oil reservoir near the bottom thereof and its upper end in the chamber, the upper end of the oil delivery conduit being turned so that oil delivered through the oil delivery conduit from the oil reservoir to the chamber drips from the upper end of the oil delivery conduit, a connection from the chamber adapted to extend to the top of a cylinder of an internal combustion engine and a rod in the oil delivery conduit reducing the effective cross-sectional area of the oil delivery conduit so as to impose restriction to the flow of oil therethrough sufficient to insure substantially uniform flow of oil through the oil delivery conduit under uniform suction from the engine despite material change in the depth of oil in the oil reservoir, the rod having a generally helical foot the bottom of which rests on the bottom of the oil reservoir.

5. A top cylinder oiler comprising an oil reservoir having a removable top, a chamber above the oil reservoir and whose bottom is defined by a portion of the removable top of the oil reservoir, the chamber comprising a side wall structure and a top, a hollow member having its upper end connected with the top of the chamber and having its lower end connected with the removable top of the oil reservoir maintaining the top of the chamber against the upper portion of the side wall structure of the chamber and maintaining the lower portion of the side wall structure of the chamber against said portion of the removable top of the oil reservoir, the hollow member also serving as an air inlet for admitting air into the upper portion of the oil reservoir, an oil delivery conduit having its lower end in the oil reservoir near the bottom thereof and its upper end in the chamber and a connection from the chamber adapted to extend to the top of a cylinder of an internal combustion engine.

RICHARD R. FARRELL.

References Cited in the file of this patent

UNITED STATES PATENTS

| Number | Name | Date |
|---|---|---|
| 1,633,378 | Heywood | June 21, 1927 |
| 1,893,073 | Dilks | Jan. 3, 1933 |
| 1,991,722 | Berray | Feb. 19, 1935 |
| 2,159,656 | Focht | May 23, 1939 |
| 2,457,389 | Maclay | Dec. 28, 1948 |

FOREIGN PATENTS

| Number | Country | Date |
|---|---|---|
| 885,050 | France | May 17, 1943 |